No. 853,637. PATENTED MAY 14, 1907.
G. E. HAWKINS.
DEVICE FOR RECORDING THE READING OF METERS.
APPLICATION FILED MAY 4, 1906.
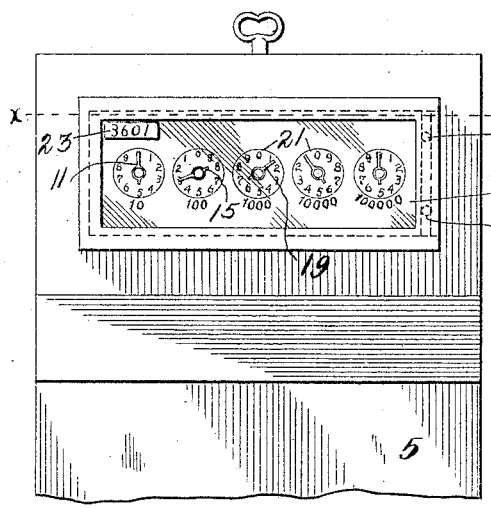
Fig. 1.
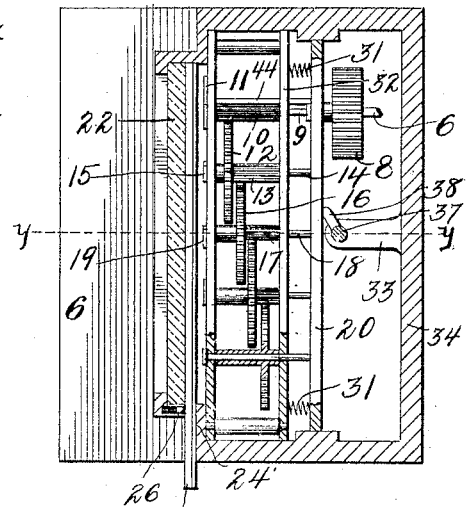
Fig. 2.
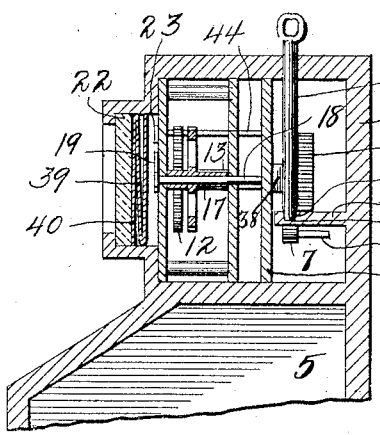
Fig. 3.
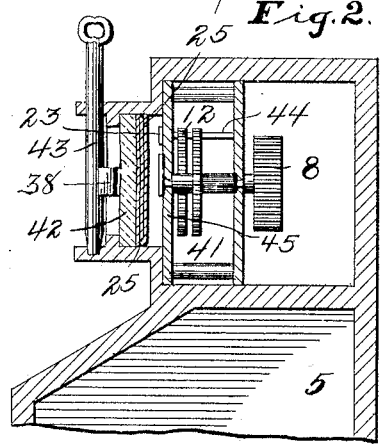
Fig. 4.
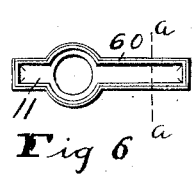
Fig. 6
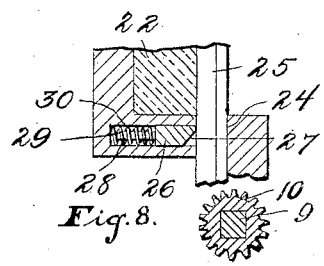
Fig. 8.
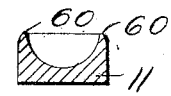
Fig. 7.
Fig. 5.
Witnesses
Carl Stoughton
Frank G. Campbell
Inventor
George E. Hawkins
By Shepherd & Parker
Attorneys

UNITED STATES PATENT OFFICE.

GEORGE E. HAWKINS, OF COLUMBUS, OHIO.

DEVICE FOR RECORDING THE READING OF METERS.

No. 853,637.  Specification of Letters Patent.  Patented May 14, 1907.

Application filed May 4, 1906. Serial No. 315,188.

*To all whom it may concern:*

Be it known that I, GEORGE E. HAWKINS, a citizen of the United States, residing at Columbus, in the county of Franklin and State of Ohio, have invented certain new and useful Improvements in Devices for Recording the Readings of Meters, of which the following is a specification.

My invention relates to a device for recording the readings of meters, and has for its object the provision of means in connection with the recording mechanism of meters of gas, water, or electric meters for obtaining an exact copy in duplicate of the position of each of the hands of the recording mechanism at the time said record is taken.

Controversies often arise between the companies owning meters and the householders concerning the bills rendered. The meters are in many instances located in cellars or other out of the way places, where the light is poor and mistakes in taking readings from the recording mechanism of the meters is particularly likely to occur.

It is therefore an object of the present invention to produce records of the meter readings which are in duplicate, and which are so arranged that one of said records may be left with the householder and the other turned in to the company's office to be filed there after the bills have been made up therefrom.

A further object of the invention is the provision of mechanism which renders it possible to obtain said duplicate records without the use of an inking mechanism. It has been found that where the hands of the recording mechanism of the meter have been inked, that the ink in the course of time clogs the hands, producing blurred impressions and interfering with the proper working of the mechanism.

Further objects and advantages of the invention will be set forth in the detailed description which now follows.

In the accompanying drawing: Figure 1 is a front elevation of a meter and its recording mechanism constructed in accordance with the invention, Fig. 2 is a horizontal section upon line $xx$ of Fig. 1, Fig. 3 is a transverse vertical section upon line $yy$ of Fig. 2, Fig. 4 is a view similar to Fig. 3, but of a modified form of the device, Fig. 5 is a detail view of a pinion and shaft hereinafter described, Fig. 6 is a detail view of one of the hands, Fig. 7 is a detail sectional view upon line A A of Fig. 6, and, Fig. 8 is a detail view upon an enlarged scale of a closure which will be hereinafter described.

Like numerals designate corresponding parts in all of the figures of the drawing.

Referring to the drawing, the numeral 5 designates the casing of an ordinary gas meter. Referring particularly to Fig. 3, the numeral 6 designates the shaft through which motion is imparted to the recording mechanism from the meter proper. This shaft carries a pinion 7 which meshes with a gear wheel 8 (see Fig. 2).

The mechanism so far described is of the usual and well known construction. The gear wheel 8 is mounted upon an angular shaft 9, said shaft passing through a pinion 10 and being slidably disposed in said pinion though turning therewith. Mounted upon the opposite end of the shaft 9 is the tens hand 11. The pinion 10 meshes with a gear wheel 12 which is integral with a pinion 13. An angular shaft 14 is slidably disposed in this pinion. The hundreds hands 15 is carried upon the forward end of the shaft 14. The pinion 13 meshes with a gear wheel 16 which is integral with the pinion 17. Slidably disposed within this pinion is an angular shaft 18, while upon the forward end of said shaft the thousands hand 19 is mounted. The rest of the meter recording mechanism is like that already described viz., the pinions in which angular shafts are slidably mounted, mesh with gear wheels which drive adjacent shafts. The inner ends of all the angular shafts are connected to a plate 20. The dials 21 with which the hands coact, are of the usual construction and said dials are normally visible through a glass plate 22 which lies in front of them. A raised lug 23 bears the meter number, which in this case has been illustrated in Fig. 1 as 3601.

A special form of hand has been devised to more effectually produce the result sought. One of these hands has been illustrated in Figs. 6 and 7 upon an enlarged scale. By referring to said figures, it will be seen that the central portion of the hand is cut out to produce type edges 60 about the periphery of the hands.

An opening 24' is formed through the side wall 24 of the casing of the recording mechanism through which a paper slip 25 may be inserted. This opening is normally closed by a strip 26 which has a beveled edge 27. Pins 28 carried by this strip 26 are encircled by springs 29, said springs normally tending to force the strip out of the recess 30 in which it lies, to close the opening. Springs 31 bear between the plate 20 and the rear wall 32 of the frame of the recording mechanism.

A bearing lug 33 projects from the rear wall 34 of the meter casing and is recessed as at 35 for the reception of the lower end 36 of a key 37, said key having a tongue 38, and serving the purpose which will be hereinafter set forth.

The slip 25 is folded as illustrated in Fig. 3 into three folds, the inner face 39 of the central fold being carboned and the inner face of the outer fold 40 also being carboned.

The operation of the device is as follows: When it is desired to obtain a record of the state of the meter, the paper slip 25 is inserted in the position shown in Fig. 2, at which time the strip 26 is forced back against the tension of the springs 29 as is best illustrated in Fig. 8. If, now, a quick turn be given the key 37, the tongue 38 thereof acts upon the plate 20 to force said plate forward. This forces the shafts and the hands mounted upon said shafts, forward and against the inner fold of the paper slip 25 and causes the carbon to print upon said paper slip, the positions of the hands with relation to each other. The carboned face 39 of the middle fold will print upon the rear face of the inner fold, while the inner carboned face of the outer fold 40 will print upon the adjacent face of the inner fold 39, thereby producing a record in duplicate.

The paper slip has been made the subject matter of a separate application which bears an even filing date herewith and is entitled "Record slip for meters," Serial Number 315187.

In the form of the device shown in Fig. 4, the meter mechanism indicated by the numeral 41 is of the usual and well known construction and the glass plate 42 is movably mounted and is adapted to be actuated by a key 43 in the same manner that the plate 20 is actuated in Figs. 1 and 2. In this form of the device when the glass plate 42 is actuated, the paper is forced up against the hands and the raised letter bearing surface 23 to cause the impression to be made. By cutting out the hands in the manner shown in Fig. 7, a type hand is formed which produces a clear cut impression. The figures 3601 are preferably raised above the surface of the lug 23. This lug is secured to a pin 44 which is carried in Figs. 1, 2 and 3 by the plate 20, while in Fig. 4 the figures carried by said lug lie the same distance beyond the dial plate 45 that the hands do. The glass plate or platen 42 not only serves the purpose of a platen when the hands and said platen are brought into contact with each other to give the desired impression, but it also forms a transparent front for the casing that incloses the registering mechanism of the meter, rendering the hands thereof visible at all times so that the meter may be read in the usual manner.

From the foregoing description, it will be seen that simple and efficient means are herein provided for obtaining a record of the reading of meter registers without the use of inking devices of any sort. But, while the elements shown and described are well adapted to serve the purposes for which they are intended, it is to be understood that my invention is not limited to the precise construction set forth, but includes within its purview any means for obtaining duplicate records in the manner set forth.

What I claim, is:

1. In a device of the character described, the combination with a meter registering mechanism, of a casing in which said meter registering mechanism is mounted, a transparent platen mounted to move in said casing toward the hands of the meter registering mechanism, said hands being normally visible through said platen and a removable key journaled in portions of the casing in front of said platen and adapted to force said platen inwardly.

2. In a device of the character described, the combination with a meter registering mechanism, comprising a plurality of rotatable hands fixed against longitudinal movement, of a casing in which said meter registering mechanism is mounted, said casing having an extension which lies in front of said hands, a transparent platen slidably disposed in said extension and movable toward said hands through which said hands are normally visible, and a manually operable member journaled in said extension in front of said platen and adapted to force said platen toward said hands.

3. In a device of the character described, the combination with a meter registering mechanism, comprising a plurality of rotatable hands fixed against longitudinal movement, of a casing in which said meter registering mechanism is mounted, said casing having an extension which lies in front of said mechanism, a transparent platen movably mounted in said extension and through which said hands are normally visible, and a removable key journaled in a portion of said extension and having a ward which is adapted to bear directly against said platen and force said platen toward said hands.

4. In a device of the character described, the combination with a meter registering mechanism and the case in which said meter registering mechanism is mounted, of an extension carried by said casing and lying in front of said meter registering mechanism, a transparent platen mounted for movement toward and from the meter hands, said platen being supported for such movement in and by the extension of the casing, and a key journaled in said casing extension and adapted to force said platen toward said hands, said hands being normally visible through said platen.

5. In a device of the character described, the combination with a meter registering mechanism and the case in which said meter registering mechanism is mounted, of an extension carried by said casing and lying in front of said meter registering mechanism, a transparent platen mounted for movement toward and from the meter hands, said platen being supported for such movement in and by the extension of the casing, and a key journaled in said casing extension and adapted to force said platen toward said hands, said casing extension having an opening formed therein for the insertion of a record slip between the platen and the hands, and said hands being normally visible through the platen.

6. In a device of the character described, the combination with a meter registering mechanism and the case in which said meter registering mechanism is mounted, of an extension carried by said casing and located in front of said meter registering mechanism, a transparent platen which forms the front of said extension of the casing, and a manually operable member controllable from the exterior of the casing which is adapted to bring the hands of the registering mechanism and said plate into engagement with each other.

In testimony whereof I affix my signature in presence of two witnesses.

GEORGE E. HAWKINS.

Witnesses:
   A. L. PHELPS,
   FRANK G. CAMPBELL.